United States Patent
Schuller et al.

(10) Patent No.: US 8,600,819 B2
(45) Date of Patent: *Dec. 3, 2013

(54) FOOD PRODUCT SCALE AND RELATED IN-STORE RANDOM WEIGHT ITEM TRANSACTION SYSTEM WITH RFID

(75) Inventors: Robert J. Schuller, Troy, OH (US); Robert J. Weisz, Aurora (CA); Nigel G. Mills, Kettering, OH (US); Mark E. Eberhardt, Jr., Troy, OH (US)

(73) Assignee: Premark FEG. L.L.C., Glenview, IL (US)

( * ) Notice: Subject to any disclaimer, the term of this patent is extended or adjusted under 35 U.S.C. 154(b) by 742 days.

This patent is subject to a terminal disclaimer.

(21) Appl. No.: 12/534,966

(22) Filed: Aug. 4, 2009

(65) Prior Publication Data

US 2009/0293423 A1    Dec. 3, 2009

Related U.S. Application Data (60) Division of application No. 10/561,497, filed as application No. PCT/US2004/020571 on Jun. 25, 2004, now Pat. No. 7,587,335, which is a continuation-in-part of application No. 10/609,446, filed on Jun. 27, 2003.

(51) Int. Cl.
*G06Q 40/00* (2012.01)

(52) U.S. Cl.
USPC .......................................................... 705/23

(58) Field of Classification Search
USPC .......................................................... 705/23
See application file for complete search history.

(56) References Cited

U.S. PATENT DOCUMENTS

| | | | |
|---|---|---|---|
| 3,711,683 | A | 1/1973 | Hamisch, Sr. |
| 3,757,037 | A | 9/1973 | Bialek |
| 3,985,605 | A | 10/1976 | Treiber et al. |
| 3,994,089 | A | 11/1976 | Schwartz |
| 4,323,608 | A | 4/1982 | Denny et al. |
| 4,423,486 | A | 12/1983 | Berner |
| 4,457,539 | A | 7/1984 | Hamisch, Jr. |
| 4,460,428 | A | 7/1984 | Teraoka |
| 4,598,780 | A | 7/1986 | Iwasaki et al. |
| 4,674,041 | A | 6/1987 | Lemon et al. |
| 4,700,791 | A | 10/1987 | Iwasaki et al. |
| 4,723,212 | A | 2/1988 | Mindrum et al. |

(Continued)

FOREIGN PATENT DOCUMENTS

| | | |
|---|---|---|
| EP | 0087310 | 8/1983 |
| EP | 0837310 | 8/1983 |

(Continued)

OTHER PUBLICATIONS

RFID: Coming Soon To A Store Near You, Anonymous, Food Engineering, v75n6, pp. 15, Jun. 2003.*

(Continued)

*Primary Examiner* — Shay S Glass
(74) *Attorney, Agent, or Firm* — Thompson Hine LLP (57) ABSTRACT

A random weight item transaction system include a scale with label RFID tag functionality, service person RFID tag functionality and customer RFID tag functionality. A slicer in proximity to the scale may include service person and bulk food product RFID functionalities. The scale may make weigh transaction data available to a computerized checkout system via a communications link or via writing the information to the label RFID tag.

7 Claims, 6 Drawing Sheets

(56) References Cited

U.S. PATENT DOCUMENTS

| | | |
|---|---|---|
| 4,821,186 A | 4/1989 | Munakata et al. |
| 4,901,237 A | 2/1990 | Hikita et al. |
| 4,901,457 A | 2/1990 | Chandler |
| 4,910,672 A | 3/1990 | Off et al. |
| 4,928,229 A | 5/1990 | Teraoka et al. |
| 4,929,818 A | 5/1990 | Bradbury et al. |
| 4,932,485 A | 6/1990 | Mori |
| 5,083,638 A | 1/1992 | Schneider |
| 5,172,936 A | 12/1992 | Sullivan et al. |
| 5,173,851 A | 12/1992 | Off et al. |
| 5,185,695 A | 2/1993 | Pruchnicki |
| 5,200,889 A | 4/1993 | Mori |
| 5,329,713 A | 7/1994 | Lundell |
| 5,350,612 A | 9/1994 | Stern et al. |
| RE34,915 E | 4/1995 | Nichtberger et al. |
| 5,439,721 A | 8/1995 | Pedroli et al. |
| 5,560,718 A | 10/1996 | Furuya |
| 5,578,797 A | 11/1996 | Hewitt et al. |
| 5,612,868 A | 3/1997 | Off et al. |
| 5,642,485 A | 6/1997 | Deaton et al. |
| 5,649,114 A | 7/1997 | Deaton et al. |
| 5,666,866 A | 9/1997 | Huang et al. |
| 5,758,328 A | 5/1998 | Giovannoli |
| 5,774,868 A | 6/1998 | Cragun et al. |
| 5,832,457 A | 11/1998 | O'Brien et al. |
| 5,857,175 A | 1/1999 | Day et al. |
| 5,865,470 A | 2/1999 | Thompson |
| 5,866,181 A | 2/1999 | Hill |
| 5,887,271 A | 3/1999 | Powell |
| 5,892,827 A | 4/1999 | Beach et al. |
| 5,895,075 A | 4/1999 | Edwards |
| 5,926,795 A | 7/1999 | Williams |
| 5,943,654 A | 8/1999 | Goodwin, III et al. |
| 5,956,877 A | 9/1999 | Raasch et al. |
| 5,974,396 A | 10/1999 | Anderson et al. |
| 5,974,399 A | 10/1999 | Giuliani et al. |
| 6,009,411 A | 12/1999 | Kepecs |
| 6,014,634 A | 1/2000 | Scroggie et al. |
| 6,026,370 A | 2/2000 | Jermyn |
| 6,026,373 A | 2/2000 | Goodwin III |
| 6,041,309 A | 3/2000 | Laor |
| 6,042,149 A | 3/2000 | Roshkoff |
| 6,047,263 A | 4/2000 | Goodwin, III |
| 6,055,573 A | 4/2000 | Gardenswartz et al. |
| 6,067,524 A | 5/2000 | Byerly et al. |
| 6,076,069 A | 6/2000 | Laor |
| 6,138,911 A | 10/2000 | Fredregill et al. |
| 6,151,586 A | 11/2000 | Brown |
| 6,151,587 A | 11/2000 | Matthias |
| 6,240,394 B1 | 5/2001 | Uecker et al. |
| 6,278,979 B1 | 8/2001 | Williams |
| 6,282,516 B1 | 8/2001 | Giuliani |
| 6,304,849 B1 | 10/2001 | Uecker et al. |
| 6,307,958 B1 | 10/2001 | Deaton et al. |
| 6,321,210 B1 | 11/2001 | O'Brien et al. |
| 6,334,108 B1 | 12/2001 | Deaton et al. |
| 6,351,735 B1 | 2/2002 | Deaton et al. |
| 6,409,401 B1 | 6/2002 | Petteruti et al. |
| 6,547,040 B2 | 4/2003 | Goodwin |
| 6,593,853 B1 | 7/2003 | Barrett et al. |
| 7,041,915 B2 | 5/2006 | Kasinoff |
| 7,156,303 B1 | 1/2007 | Holzman |
| 7,230,580 B1 | 6/2007 | Kelkar et al. |
| 7,311,251 B1 | 12/2007 | White |
| 7,347,372 B1 | 3/2008 | Goodwin, III |
| 7,551,077 B2 | 6/2009 | Raybuck et al. |
| 2001/0024157 A1 | 9/2001 | Hansmann et al. |
| 2002/0076683 A1 | 6/2002 | Chen |
| 2002/0178060 A1 | 11/2002 | Sheehan |
| 2003/0063139 A1* | 4/2003 | Hohberger et al. ............... 347/2 |
| 2003/0205412 A1 | 11/2003 | Hewitt |
| 2006/0237546 A1 | 10/2006 | Lapstun |
| 2008/0120193 A1 | 5/2008 | Schuller et al. |
| 2008/0251009 A1 | 10/2008 | Nagai et al. |
| 2009/0072019 A1 | 3/2009 | Shibata et al. |

FOREIGN PATENT DOCUMENTS

| | | |
|---|---|---|
| EP | 0311437 | 7/1988 |
| EP | 0837411 | 4/1998 |
| EP | 0853290 | 7/1998 |
| EP | 1197892 | 4/2002 |
| EP | 1248244 | 10/2002 |
| EP | 1854637 | 11/2007 |
| FR | 2674954 | 10/1992 |
| FR | 2741987 | 6/1997 |
| JP | 60193824 | 10/1985 |
| JP | 63144667 | 6/1988 |
| JP | 63178875 | 7/1988 |
| JP | 63191370 | 8/1988 |
| JP | 3138171 | 6/1991 |
| WO | 03/029005 | 4/2003 |
| WO | WO 2005/004071 | 1/2005 |

OTHER PUBLICATIONS

U.S. Appl. No. 10/454,588, filed Jun. 5, 2003, Hewitt.

Ishida, *AC-3000 Series brochure*, 6 pages, published at least as early as Nov. 26, 1996.

Hobart Food Equipment, "*CLA Compact Label Applier*," for Trayed Self-Service Meat, Poultry, Fish and Produce, 2 pages, May 1993.

Hobart Food Equipment, "*Hilite Label Printer & Applier*," for Printing and Applying Merchandising Labels, 2 pages, May 1988.

Hobart Food Equipment, "*Ultima 2000 PLU Prepack Weighing System*," The Hobart Ultima 2000 PLU Prepack Weighing System Provides Merchandising Flexibility, Nutritional and Text Printing and Is Very Simple to Use, 6 pages, Mar. 1993.

Hobart, "*Ultima 2000*," The ultimate pre-pack scale/printer merchandising system, 6 pages, Dec. 1992.

Hobart, "*Weigh/Wrap/Label System*," 16 pages, Aug. 1999.

"*Automatic identification is flying high; a report on the impact on manufacturing and distribution of automatic identification technology*," Knill, Bernie, Industry Week, vol. 234, p. A1(23), Aug. 24, 1987.

PCT, International Search Report and Written Opinion, International Application No. PCT/US2010/038104 (Aug. 20, 2010).

\* cited by examiner

FOOD PRODUCT SCALE AND RELATED IN-STORE RANDOM WEIGHT ITEM TRANSACTION SYSTEM WITH RFID

CROSS-REFERENCE TO RELATED APPLICATIONS

This application is a divisional of U.S. application Ser. No. 10/561,497, filed Dec. 19, 2005, which is a national phase filing of PCT International Application No. PCT/US2004/020571, filed Jun. 25, 2004 which is a Continuation-In-Part of U.S. application Ser. No. 10/609,446, filed Jun. 27, 2003.

TECHNICAL FIELD

The present invention relates generally to scales of the type commonly used in groceries and supermarkets for weighing and pricing random weight items in the nature of food products such as meats and produce and, more particularly, to scales incorporating RFID functionality.

BACKGROUND

Perishable food departments, such as deli departments in stores, commonly utilize slicers to slice food product and scales to weigh and print labels for the sliced food product. Currently the scales print labels with a bar code thereon that can be scanned by a bar code scanner at checkout. With the development of RFID tags, there is a need for a random weight scale and related transaction system operable with such RFID tags.

SUMMARY

A scale and related system with RFID capabilities enables random weight items to be priced and handled through checkout using an RFID tag associated with a label applied to the weighed item.

DESCRIPTION

Figure 1:
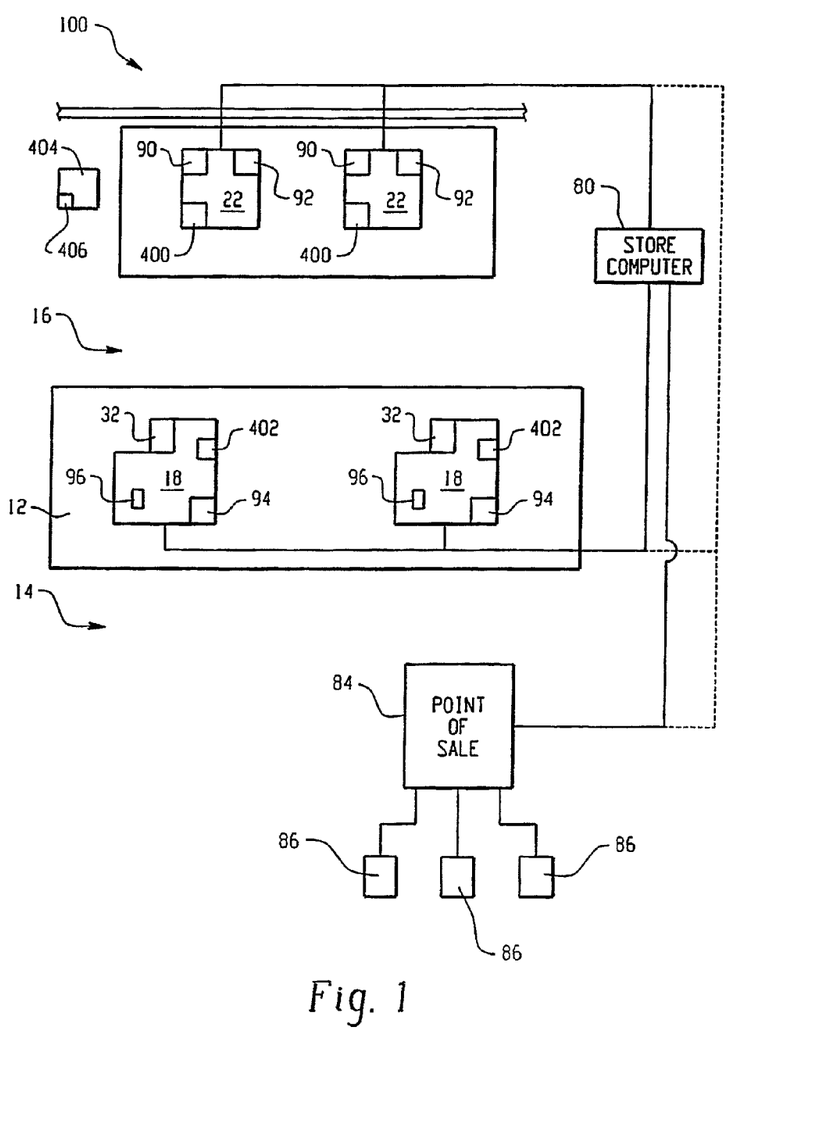
FIG. 1 is a schematic of one embodiment of a random weight item transaction system.

Referring to FIG. 1, in one embodiment a basic store random weight item transaction system 100 contemplated herein includes one or more scales 18 with RFID capability and one or more food product slicers 22 with RFID capability. The scales may typically be located on or above a counter 12 (as may be formed atop a refrigerated food product display unit) in the deli department having a customer side 14 and a service person side 16. The slicers may be located atop another counter located at the service person side 16 of the counter 12. Communications are provided between the slicers 22 and the scales 18, either through the store computer system 80 or directly as reflected by communications path 82. Likewise, communications between the scales 18 and the point-of-sale (P.O.S.) computer 84 and its associated checkout terminals 86 may be provided through the store computer 80 or directly. The illustrated communications paths may be hard-wired paths, wireless or combinations of the two. The store computer system 80 may be located within the store or may be formed by a computer network including portions outside the store, such as a centralized store computer system used for multiple stores in different locations. The point-of-sale computer 84 could also be integrated with the store computer 80.

Each slicer 22 may include RFID capability 90 for detecting a service person RFID tag and an RFID capability 92 for detecting the food product RFID tag associated with a food product being sliced. For example, each loaf of meat or cheese product may have a manufacturer originated RFID tag incorporated into one end of the packaging thereof so that the food product RFID tag stays with the loaf until the entirety of the loaf has been sliced and distributed to customers. Such RFID tags are identified herein as "bulk-product RFID tags." Each service person could also wear an RFID tag while working in the deli as will be described in greater detail below. While RFID capabilities 90 and 92 are shown as different parts of the slicer 22, it is recognized that a single RF detection system of each slicer 22, with a single RF transponder, might be used for both purposes.

Each scale 18 may include an RFID capability 32 for detecting a service person using the scale and an RFID capability 94 for detecting a customer being serviced by the scale. An RFID capability 96 for use in connection with labels output by a printer associated with the scale may also be provided, as will be described in greater detail below. While RFID capabilities 32, 94 and 96 are shown as different parts of the scale 18, it is recognized that a single RF detection system of each scale 18 might be used for all of these purposes.

For the sake of the following exemplary discussion, it is assumed that communications take place through the store computer system 80.

In one contemplated operation, when a service person places a food product on a slicer 22 to perform a slicing operation, the RFID component 90 detects the service person's RFID tag, which uniquely identifies the service person, and the RFID component 92 detects the bulk-product RFID tag of the food product placed on the slicer 22. The service person and the specific food product can thereby be linked and this information is forwarded to the store computer system 80, which maintains a list or database of open slice/weigh transactions. A time stamp may also be associated with the linked service person and food product. Upon the store computer's receipt of the information from the slicer 22, a slice/weigh transaction is opened for the service person, and the identity of the specific food product is linked to the service person for that slice/weigh transaction. The bulk-product identifier may also be incorporated into the slice/weigh transaction data, enabling the source of the food product to be tracked back to the specific loaf from which it came (as well as any other source details that might have previously been associated with the bulk-product identifier). When the service person has completed slicing, and subsequently moves to a scale 18 to weigh the sliced food product, the RFID component 32 of the scale 18 detects the service person's RFID tag, logs the service person into the scale and communicates with the store computer 80 to retrieve open slice/weigh transactions for that service person. Any such open slice/weigh transactions are presented on a display 28 (FIG. 2) of the scale 18, primarily as identifying the food product associated with each such open transaction, enabling the service person to select one of the transactions, which selves as an identification to the scale 18 of the food product being weighed. If needed, the service person can also manually open a new transaction in the event of, for example, weighing of a pre-sliced food product or a pre-processed food product (such as potato salad or bean salad or cole slaw). The scale 18 can then retrieve from a pricing database (stored internal to the scale or stored at the store computer system 80 level) the appropriate price per unit weight for the product being weighed. Where the scale includes the RFID component 94, which is provided to identify a unique RFID tag associated with each customer (in the form of a frequent shopper RFID card for example), a customer display 29 (FIG. 2) on the scale 18 may advise the customer to place scan his/her card in proximity to the scale for reading. The identification of the customer may be used in connection with the retrieval of price from the pricing database. For example, where a tiered pricing system is used for products within the store, the price per unit weight for the item being weighed may be set based in part upon the pricing tier assigned to the identified customer. The identification of the customer may also be used to select incentives, such as coupons, that will be delivered or communicated to the customer (as by printing on a label or ticket or displaying on display 29).

At the completion of the weighing and pricing operation, the scale 18 effects output of a product pricing label that can be applied to the food product. The slice/weigh transaction is then removed from, or marked as completed in the open slice/weigh transaction list of the store computer system 80 so that the transaction will no longer be retrieved for that service person when logged into a scale. As contemplated herein, the scale prints information such as product name, price per unit weight and total price on the label, but each label output also includes an RFID tag incorporated therein, which will be used for checkout purposes when the customer has completed his/her shopping experience. Where the label RFID tag is a read only tag storing a unique tag number, the RFID component 96 of the scale reads the tag number of the label RFID tag incorporated in the label that will be output for the transaction. The scale 18, or store computer 80, links the tag number of the label RFID tag to labeling transaction data (e.g., the product and the price for the labeling transaction, and perhaps incentive offer information and a time stamp) and this information is forwarded on to the point-of-sale computer system 84, which maintains a database of labeling transactions. When the customer subsequently checks out, the label RFID tag located on the label applied to the food product is detected by an RF detection unit at checkout, and the product and price information is retrieved from the labeling transaction database, enabling the price of the product to be incorporated into the customer's cumulative checkout price. Once the checkout transaction is completed, the labeling transaction can be removed from, or marked as completed in the labeling transactions database of the point-of-sale computer system 84.

Where the label RFID tag is a read/write tag, the scale RFID component 96 may actually write a unique number to the label RFID tag. The scale 18, or store computer 80, links the tag number written to the label RFID tag to labeling transaction data and this information is forwarded on to the point-of-sale computer system 84 as described above. In another variation the RFID component 96 may write the labeling transaction data (e.g., product, price per unit weight and total price) to the label RFID tag, enabling the information to be read from the label RFID tag by an RF tag reader at checkout.

In another contemplated embodiment, the slicer 22 may include an additional RFID functionality 400 and the scale 18 may include an additional RFID functionality 402. At the slicer 18, the food product may be sliced onto a tray or wrapping paper 404 having a an RFID tag 406 that may be read only or read/write. Having read the bulk-food product RFID tag via function 92 the scale may either write an identification number to the tray RFID tag 406 (in the case of read/write RFID tag) or read the identification number from the RFID tag (in the case of read only RFID tag). The scale 18 or store computer 80 then link the bulk-food product identifier, food product identity and service person identity to the identification number of the RFID tag 406 (as in a database) and makes the information available to the scales 18. When the service person takes the tray or wrapping paper 404 with the food product thereon to the scale for a weighing operation, the RFID function 402 of the scale reads the identification number 406 of the scale and is thereby able to retrieve the information about the food product being weighed. Output of a label and label RFID tag can then proceed per the previously described operation. In the tray embodiment the tray could be reused for multiple slice-weigh transactions.

Figure 2:
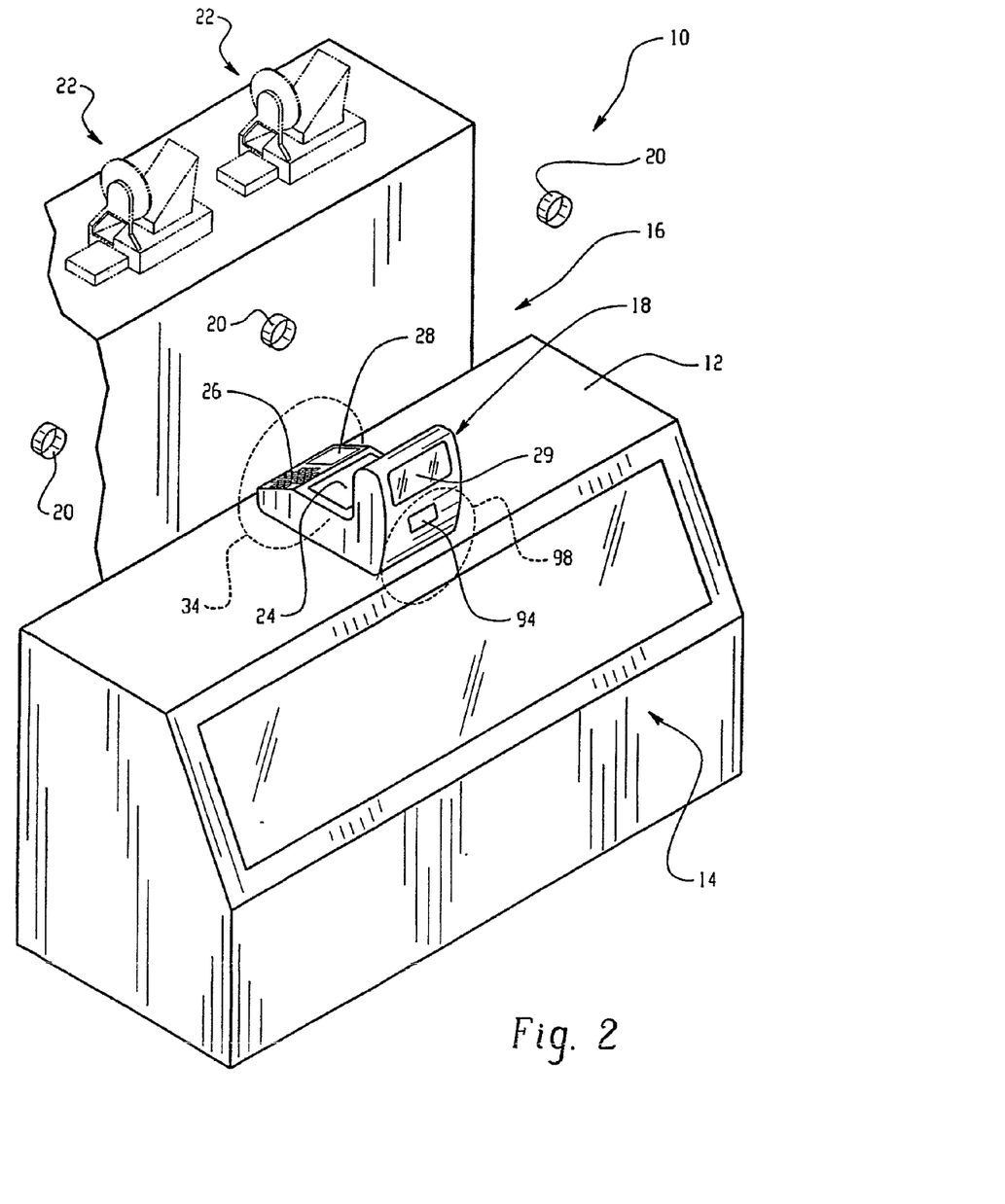
FIG. 2 is a partial perspective of an exemplary deli department.

Referring to FIG. 2, a scale 18 located atop the counter 12 is shown, and multiple service person RF identification units 20 separate from the scale are shown. In the illustrated embodiment a single scale 18 is shown, but per FIG. 1 multiple scales may be provided. The RF identification units 20 may take the form of wrist-band type units, or other structures, that are worn proximate to the hands of the service persons (not shown). The scale is adapted for enabling multiple service persons to utilize the scale. Typically such multiple service persons move around on the service person side 16 of the counter 12, interacting with customers, slicing food products at slicers 22 and then using the scale or scales 18 to weigh and label the sliced food products.

The scale 18 includes a weighing station 24 for receiving items to be weighed and having an associated mechanism, such as a load cell located internal of the scale housing, for producing weight indicative signals when items are placed on the weighing station 24. The scale 18 also includes an input device 26, which in the illustrated embodiment takes the form of a plurality of input keys or buttons located alongside an operator display screen 28. A touch-screen type display could also be used. Also shown is a customer display screen 29. The scale includes a controller 30 (FIG. 3) operatively connected to the input device 26 and the mechanism. Communication link 44 is provided for communication with store computer system 80, slicers 22 and point-of-sale computer system 84 per FIG. 1.

The scale 18 includes RF detection system 32 (FIG. 3) outputting an RF detection field 34 in proximity to the input device 26 for detecting the presence of service person RF identification units 20 near the input device 26. In the illustrated embodiment, the RF detection field 34 defines a limited detection range. In one example the detection range may be no more than twelve inches from the input device 26 (such as in the range of six to twelve inches). In another example the detection range may be no more than eighteen inches from the input device 26. The limited detection range enables multiple service persons to repeatedly move back and forth past the scale 18 without having the RF detection system detect their respective RF identification units 20 until a given service person takes an action indicative of an intent to use the scale 18 by moving the hand having the associated RF identification unit 20 toward the input device 26 and within the limited detection range of the RF detection field 34.

In the system 10, the service person RF identification units 20 (also referred to as service person RFID tags) may be passive, read only RF identification units 20 that are powered by the RF detection field 34 output by the scale 18. In other words, each RF identification unit includes a coil across which an electrical signal is induced or otherwise developed when it is positioned in the RF detection field. That electrical signal is used to power the unit, causing it to become active when it is within the RF detection field 34. The unit 20 uses an impedance modulation technique to transfer information back to the transmit/receive coil 36 (FIG. 3) of the scale. The information transmitted might typically be a unit specific code or number stored in memory of the unit 20. An example of a suitable RF identification unit that could be used is the e5530 unit available from Atnel in San Jose, Calif. (www.atmel.com), in which case each unit comes preprogrammed with a unique code stored in programmable read only memory. The e5530 may typically be used with an RF detection field 34 generated at a frequency between 100 kHz and 450 kHz. It is recognized that wide variations in frequency are possible depending upon the nature of the RF detection unit and the desired detection range, with higher frequencies typically being used to enable grater detection ranges. In one embodiment, the RF detection field 34 is generated at 125 kHz. Once the e5530 is placed in the RF detection field 34 and powered up as a result of the same, it begins transmitting its unique code via impedance modulation which dampens the RF signal of the detection field enabling a demodulator 38 (FIG. 2) to detect the code.

In one embodiment the RF detection system 32 includes transmit/receive unit 40 associated with transmit/receive coil 36, a timing circuit 42 associated with the unit 40 and a demodulator 38 connected to unit 40. The demodulator identifies RF identification unit codes and sends them to the scale control 30. The scale control 30 may include an internal database of acceptable RFID codes, or may access a remote database (e.g., the store computer) of acceptable codes via communications link 44. The scale control 30 determines if a detected RFID code is acceptable and, if so, automatically performs an operator login operation enabling the service person wearing the RF identification unit with the acceptable code to use the scale for an item weigh and label print transaction, in the manner previously described above with respect to FIG. 1. The scale may be considered to be in an idle mode, awaiting login, during non-use periods. After the automatic login the scale is placed in an operating mode. In one example, during the idle mode the scale may be adapted to prevent labels from being printed, while in the operating mode labels can be printed for weighed items.

Figure 4:
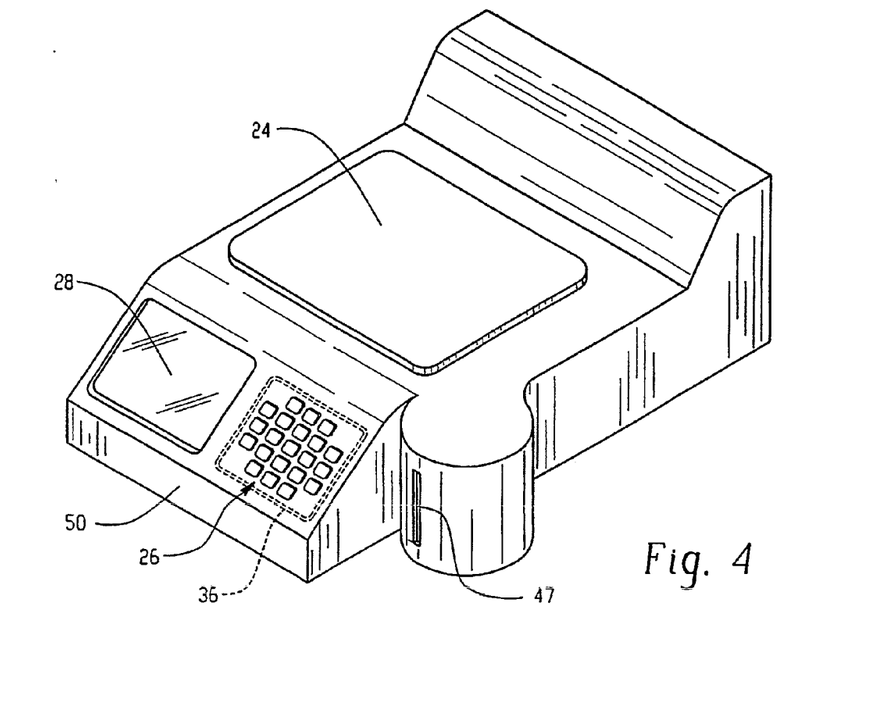
FIG. 4 is a perspective view of the exemplary scale.

Referring to FIG. 4, in one contemplated embodiment the transmit/receive coil 36 is located internal of the scale housing and extends about the region in which the user input device 26, or a portion of the user input device, is located. With such an embodiment, the RF detection field 34 can be controlled to have a fairly limited detection range that would normally require a service person wearing an RF identification unit in proximity to his/her hand to move the hand toward or otherwise near the user input device 26 as service persons normally do when they are weighing an item and need to enter the PLU number of the item being weighed. In such cases, the scale control may perform the automatic operator login as soon as an acceptable RF identification unit is detected within the RF detection field 34. In an alternative embodiment of the scale system, rather than performing the automatic operator login as soon as an acceptable RF identification unit is detected within the RF detection field 34, the scale could be configured to only perform the automatic operator login after an acceptable RF identification unit is detected within the RF detection field for at least a minimum time duration. In one example of such an embodiment the RF identification units may take the form of items worn around the neck as by a chain. In another example the RF identification units may take the form of clip on tags that can be clipped to a shirt collar or shirt pocket. In still another example the RF identification units may simply be held in a shirt, coat or pants pocket.

Figure 3:
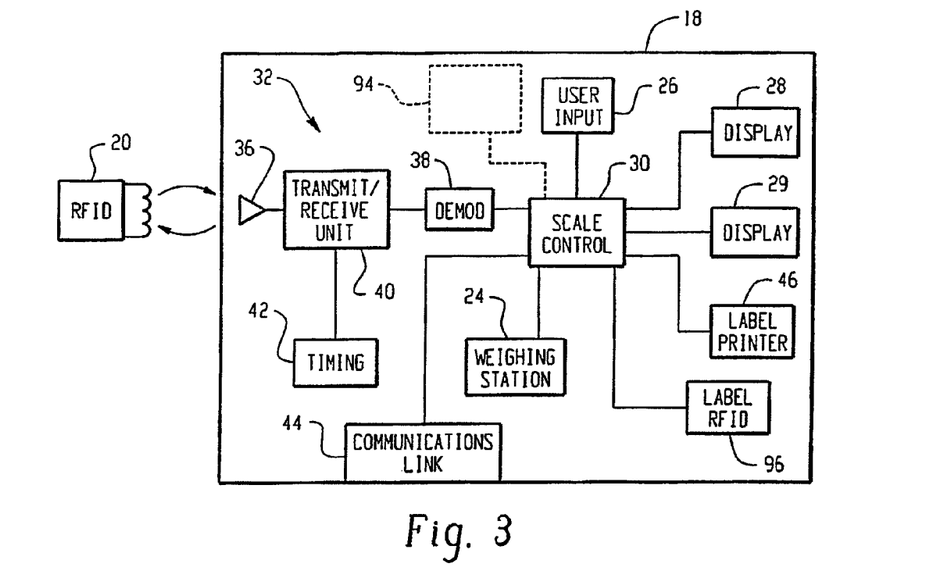
FIG. 3 is a schematic of an exemplary scale including service person RFID tag detection, customer RFID tag detection and label RFID tag capability.

FIG. 3 also schematically shows the label printer 46 and its associated label RFID unit 96, which may be a read only RF unit or a read/write RF unit as necessary. Exemplary of a label RFID mechanism having read/write capability is that described in U.S. Pat. No. 6,246,326. FIG. 4 shows a side located housing part of the scale for containing the printing mechanism 46 and label RFID unit 96, and having an exit slot 47 for labels. It is contemplated that the housing surrounding the label RFID unit 96 may include suitable shielding to prevent the service person RF detection system 32 from interfering with its operation, assuming the operating frequencies of the two are sufficiently close that such a problem could result. Also shown in FIG. 3 is customer RF detection unit 94, which could be of similar form to the previously described RF detection system 32. Referring to FIG. 2, the customer RF detection unit could be oriented to output a localized RF detection field 98 on the customer side of the scale. It is also recognized that the RFID units 90 and 92 (FIG. 1) of the slicers 22 could be similar to RF detection system 32, but variations of RF detection units are possible.

Figure 5:
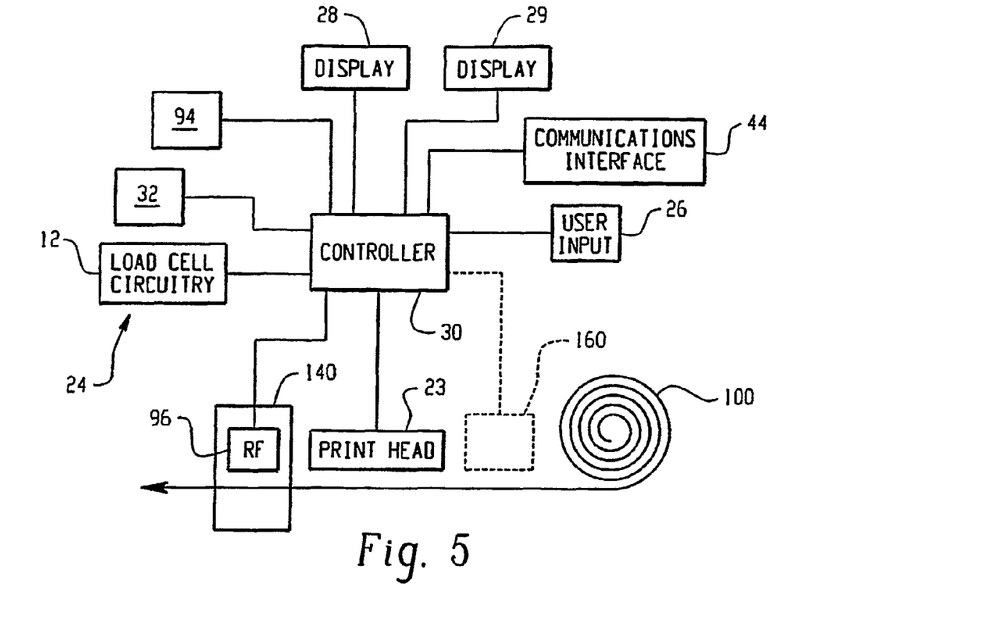
FIG. 5 is a scale schematic showing a label supply.

Referring now to FIG. 5, a schematic drawing of the scale 18 showing its associated supply of labels 100 is provided. As previously noted, the labels may incorporate RFID tags that store information (either read only or read/write). In one embodiment each and every label includes a pre-attached RFID tag. The label RF unit 96 may be enclosed within RF shielding 140, with openings to allow labels to pass through, so that only the RFID tag of a single label can be read or written to by the unit at any given time. In an alternative arrangement, the label RF unit 96 may be positioned upstream of the print head 23 at location 160 enabling the RF unit 96 to be used to identify non-functioning label RFID tags so that the labels associated with such non-functioning tags can be discarded. For example, in the case of a non-functioning label RFID tag the print head 23 could be controlled to print a VOID message on the label to be sure that the service person knows not to use the label and/or the scale display 28 could display a "Bad Label" message to the service person.

Figure 7:
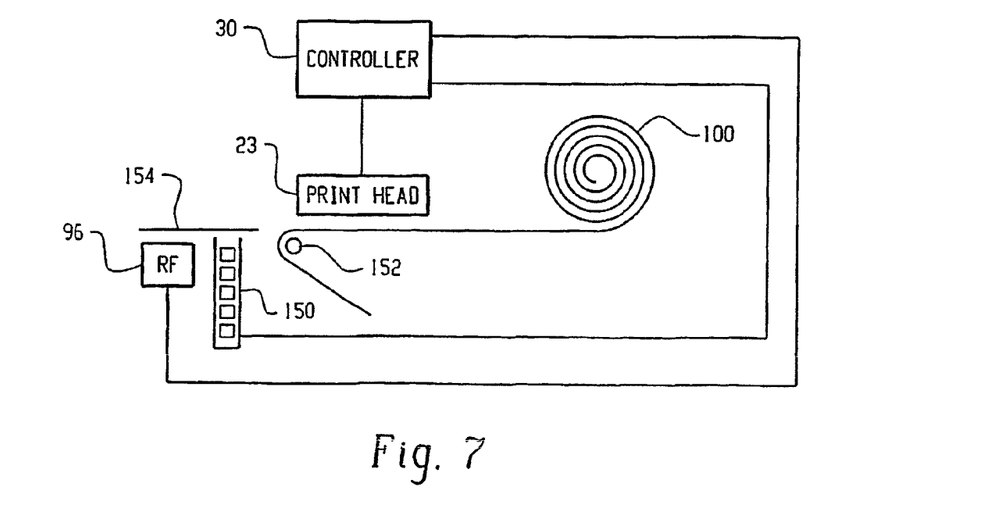
FIG. 7 is a schematic of another embodiment of a random weight item transaction system.

In another embodiment the scale 18 includes a mechanism for selectively attaching RFID tags to certain labels as needed. For example, referring to FIG. 7, a label RFID tag feed unit 150 with an associated supply of label RFID tags may be positioned to selective move tags into position for attachment to the adhesive side of a label 154 after the label has been removed from label stock by passing the label stock around a peel bar 152. The label RF unit 96 is shown downstream to perform a read/write operation after the RFID tag has been applied to the label, but it is recognized the label RF unit 96 could be positioned to read/write from/to the label RFID tag before it is attached to the label. In a further embodiment the scale 18 includes a mechanism for attaching the RFID tag to the package separate from the product label that is printed (e.g., as a separate label).

As previously mentioned, in the case of labels incorporating passive, read only RFID tags it is contemplated that each tag would be pre-configured to store a distinct number and the RF unit 96 would take the form of an RF reading mechanism that outputs a localized RF detection field in the vicinity of the labels as they exit the scale, in order to read the number from the RFID tag of each label that is printed. The scale would then associate the number of the read RFID tag with the weighed product (e.g., type (e.g., PLU number), weight and price) and make that information available to the computerized checkout system (e.g., by sending the information to an appropriate database such as the labeling transaction database), where the checkout system would include an RF reading unit (in place of or in addition to the bar code scanner) to read the number from the RFID tag of the weighed item when presented at checkout. The checkout system would then access a database (e.g., the labeling transaction database previously mentioned) according to the read label RFID number to identify the product and its price for transaction totaling purposes. In this type of system, when one or more incentives are associated with the product that is weighed by the scale, the incentive information can also be accessed by the computerized checkout system once it identifies the product type. For example, when a customer obtains a weighed food product from the deli the customer the incentive offer may be that the customer gets some sort of price reduction on a different food product or item (referred to as the "incentive product"). If the customer presents both the weighed food product and the incentive product at checkout, the customer will be given the price reduction. The computerized checkout system can determine whether any of the incentive products that might be associated with a specific label RFD number are also presented at checkout in order to automatically apply price adjustments, without requiring the customer to present any coupon. In another embodiment, where a separate incentive label or ticket is presented to the customer and it identifies multiple incentives, the scale may automatically link the unique number of the RFID tag of such incentive label or ticket to the multiple incentives, and make that information available to the computerized checkout system, so that the incentive label or ticket can be presented by the customer at checkout in a coupon type fashion.

In the case of labels incorporating read/write RFID tags it is contemplated that the RF unit 96 would take the form of a RF read/write unit to write information (e.g., an ID # or type (e.g., PLU number), weight and price) to the RFID tag, where the checkout system would include an RF reading unit to read the information from the RFID tag of the weighed item when presented at checkout. Incentive offer information could also be written to the RFID tag.

Figure 8:
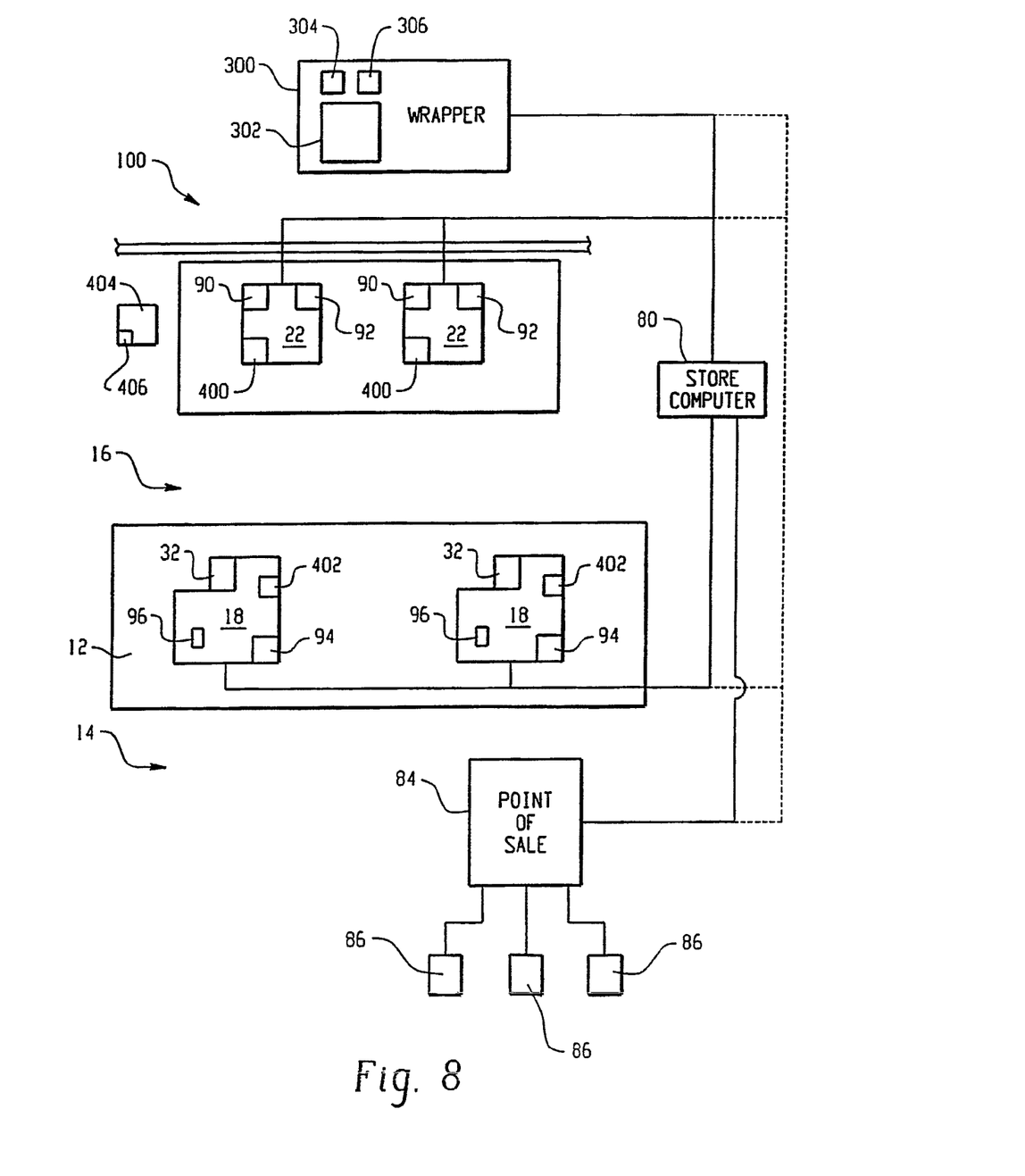
FIG. 8 is an embodiment of a random weight item transaction system including a back room package wrapping machine with an integrated scale.

In another arrangement shown in FIG. 8 the scale may be integrated with a package wrapping machine 300 of the type commonly used to wrap items such as trayed food products. Such wrapping machines 300 are typically located in a back room of a meat, fish or bakery department. The machine 300 includes a weighing station 302 along with two different label mechanisms 304 and 306. Label mechanism 304 may print and apply 304 a printed product pricing label to the package and label mechanism 306 may apply a separate RFID label (e.g., a label incorporating an RFID tag) to the package. Alternatively the RFID tag may be incorporated into the product pricing label. The wrapping machine 300 may provide the linked labeling transaction data for each RFID label to the point-of-sale computer system in the manner previously described. Thus, FIG. 7 clearly contemplates an embodiment in which the RFID tag applied to a random weight product is not structurally tied to the printed product pricing label for that product. It is contemplated that the same technique could be used in scales 18 by providing a separate set of labels for applying the label RFID tags, although such an arrangement would necessitate a service person having to apply two labels to a package rather than one. As used herein, the term "label" is to be broadly construed as encompassing any form of media (e.g., paper, plastic etc.) that can be attached to the product package (e.g., typically by an adhesive on one side of the media).

Although certain embodiments have been described and illustrated in detail it is to be clearly understood that the same is intended by way of illustration and example only and is not intended to be taken by way of limitation. For example, while the use of passive type RF identification units 20 is described, active, self powered RF identification units could be used in some cases.

Figure 6:
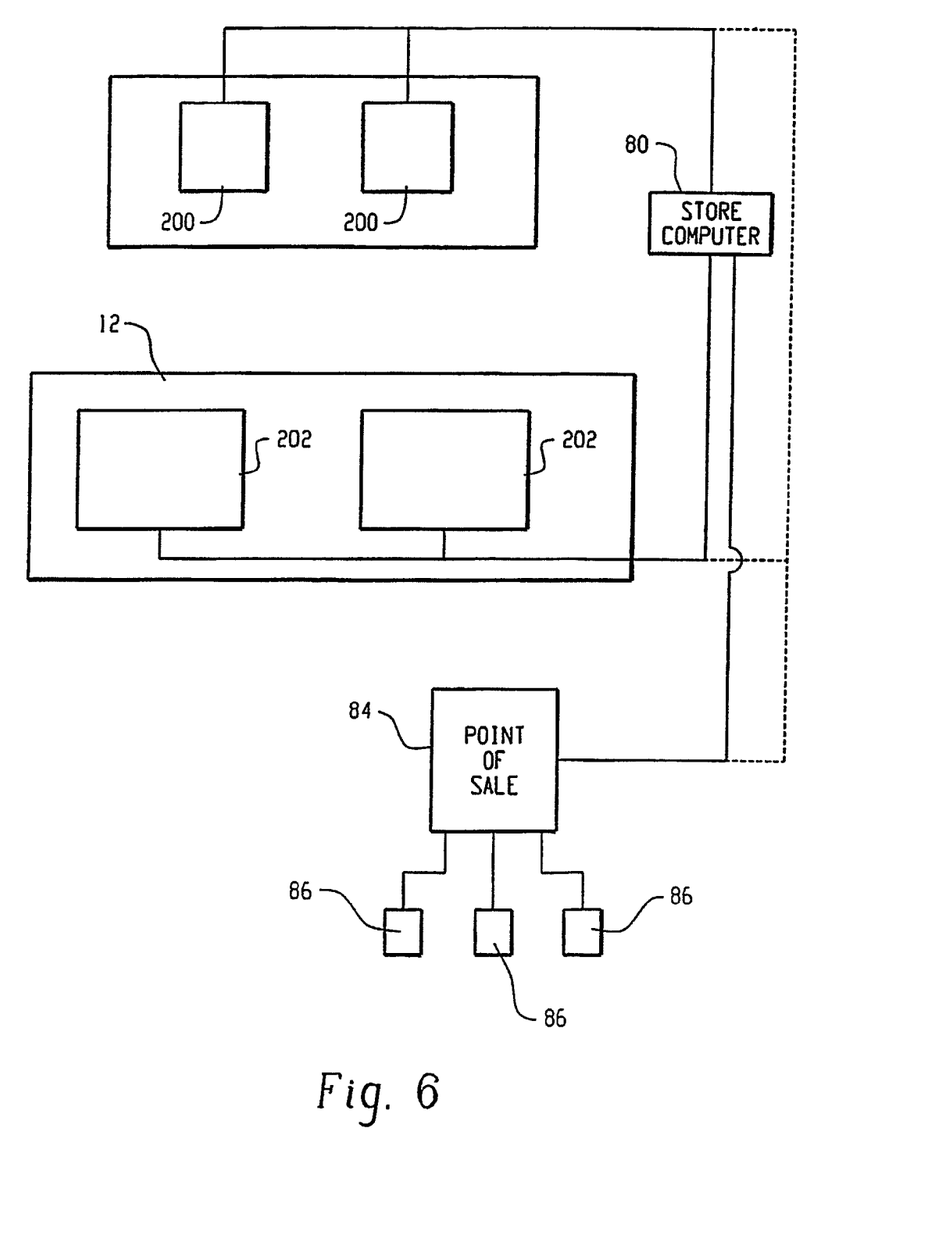
FIG. 6 is a schematic of another embodiment of a random weight item transaction system.

Moreover, while the illustrated embodiment reflects a deli system with separate scales 18 and slicers 22, it is contemplated that the deli system may make use of a legal for trade slicer that includes its own weighing station. Referring to FIG. 6, the legal for trade slicers 200 may be linked to countertop customer displays 202 either directly or through the store computer for enabling the customer to view the price information. In addition to including service person RFID detection and bulk food product RFID detection, as per slicers 22 of FIG. 1, the legal for trade slicers 200 (FIG. 6) may include a label printer and associated label RFID unit. Alternatively, the label printer and RFID unit may be incorporated into the countertop customer displays 202.

What is claimed is:

1. A food product scale comprising:
    a housing;
    a label supply location within the housing;
    a print head located within the housing along a label path for printing indicia on labels passing thereby;
    a label RF unit for reading and/or writing label RFID tags on labels, the label RF unit positioned downstream of the print head along the label path so as to read and/or write label RFID tags after printing on the labels carrying the label RFID tags has been effected by the print head; and
    a controller associated with the print head and the label RF unit for operation thereof;
    wherein a peel bar is located for separating labels from label stock, the label RF unit is located downstream of the label peel bar;
    a weighing station for receiving an item to be weighed;
    the controller operable to establish a price for a weighed item based in part upon a weight indicative signal produced by the weighing station.

2. The food product scale of claim 1 wherein
    a RFID tag feed unit is located between the peel bar and the label RF unit for applying label RFID tags to labels.

3. The food product scale of claim 1 wherein
    in connection with weighing and pricing an item the scale is adapted to output a label with an associated label RFID tag having an identification number, the label RF unit detects the identification number stored in the associated label RFID tag or writes the identification number to the associated label RFID tag.

4. A package wrapping machine including the food product scale of claim 1.

5. The food product scale of claim 1 wherein
    the housing around the label RF unit includes RF shielding.

6. A food product scale for handling labels with associated RFID tags, the mechanism comprising:
    a housing;
    a label supply location within the housing;
    a print head located within the housing along a label path for printing indicia on labels passing thereby;
    a label RF unit for reading and/or writing label RFID tags on labels;

a weighing station for receiving an item to be weighed; and a controller associated with the weighing station to establish a price for a weighed item based in part upon a weight indicative signal produced by the weighing station, the controller further associated with the print head and the label RF unit for operation thereof, wherein during a label output process the controller is operable to:

control the label RF unit to identify whether a given label includes a non-functioning label RFID tag and, if so, to control the print head to effect printing of a void indication on the given label.

7. The food product sale of claim 6 wherein the food product scale includes a user display screen, the controller connected for controlling information display by the user display screen;

if the controller identifies that the given label includes a non-functioning label RFID tag, the controller further operates to cause the user display screen to display a bad label message.

\* \* \* \* \*